(12) United States Patent
Hashiguchi et al.

(10) Patent No.: US 9,817,300 B2
(45) Date of Patent: Nov. 14, 2017

(54) SYSTEM CAMERA LENS ADAPTOR

(71) Applicant: Nihon Video System Co., Ltd., Tsushima-shi, Aichi (JP)

(72) Inventors: Kentaro Hashiguchi, Tsushima (JP); Hidetake Sugita, Tsushima (JP)

(73) Assignee: Nihon Video Systems Co., Ltd., Tsushima-shi, Aichi (JP)

( * ) Notice: Subject to any disclaimer, the term of this patent is extended or adjusted under 35 U.S.C. 154(b) by 0 days.

(21) Appl. No.: 15/211,907

(22) Filed: Jul. 15, 2016

(65) Prior Publication Data

US 2017/0108763 A1 Apr. 20, 2017

(30) Foreign Application Priority Data

Jul. 15, 2015 (JP) .................... 2015-141704

(51) Int. Cl.
*G03B 17/56* (2006.01)
*G03B 17/14* (2006.01)
*G03B 9/06* (2006.01)
*G02B 5/00* (2006.01)
*G03B 17/18* (2006.01)

(52) U.S. Cl.
CPC .......... *G03B 17/566* (2013.01); *G02B 5/005* (2013.01); *G03B 9/06* (2013.01); *G03B 17/14* (2013.01); *G03B 17/18* (2013.01); *G03B 17/565* (2013.01)

(58) Field of Classification Search
None
See application file for complete search history.

(56) References Cited

U.S. PATENT DOCUMENTS

| 4,589,750 A * | 5/1986 | Tomori ................. G03B 17/14 348/363 |
| 5,257,058 A * | 10/1993 | Mabuchi ............... G03B 17/14 348/240.3 |
| 5,652,921 A * | 7/1997 | Kawano ................ G03B 7/095 396/132 |
| 6,407,774 B1 * | 6/2002 | Mabuchi ........... H04N 5/23209 348/335 |
| 2002/0026696 A1 * | 3/2002 | Takeda ............... G02B 27/646 27/21.1 |
| 2004/0189859 A1 * | 9/2004 | Yoshikawa ........ H04N 5/23212 348/360 |

(Continued)

FOREIGN PATENT DOCUMENTS

| JP | H07-225424 A | 8/1995 |
| JP | 2002-156695 A | 5/2002 |

(Continued)

OTHER PUBLICATIONS

Office Action dated Sep. 24, 2015, issued in corresponding Japanese Patent Application No. 2015-141704, filed Jul. 15, 2015, 8 pages.

*Primary Examiner* — W B Perkey
(74) *Attorney, Agent, or Firm* — Christensen O'Connor Johnson Kindness

(57) ABSTRACT

A system camera lens adaptor that enables iris adjustment by a cameraman at hand is provided. According to the present invention, provided is a system camera lens adaptor enabling mounting, on a camera device, of a lens device originally not mountable on the camera device, including an iris volume capable of adjusting an iris of the lens device.

17 Claims, 3 Drawing Sheets

(56) References Cited

U.S. PATENT DOCUMENTS

| | | | | |
|---|---|---|---|---|
| 2005/0140816 | A1* | 6/2005 | Tschida | H04N 5/23209 348/360 |
| 2013/0077952 | A1* | 3/2013 | Sugiyama | G03B 17/56 396/530 |
| 2014/0125829 | A1* | 5/2014 | Hashiguchi | H04N 5/23203 348/211.99 |
| 2015/0009585 | A1* | 1/2015 | Ho | G03B 17/565 359/827 |

FOREIGN PATENT DOCUMENTS

| | | |
|---|---|---|
| JP | 2009-089114 A | 4/2009 |
| JP | 2013-238802 A | 11/2013 |
| JP | 2014-082594 A | 5/2014 |

* cited by examiner

SYSTEM CAMERA LENS ADAPTOR

TECHNICAL FIELD

The present invention relates to a system camera lens adaptor that enables mounting, on a camera device, of a lens device originally not mountable on the camera device.

BACKGROUND ART

Television cameras include large cameras (EFP cameras) mainly used in a studio and the like and small cameras (ENG cameras) mainly used portably for news gathering and the like. Such an EFP camera is used by mounting a large box television lens (EFP lens) thereon, and such an ENG camera is used by mounting a small television lens (ENG lens) thereon.

There are increasing cases of mounting an EFP lens on an ENG camera for use. In such a case, between the ENG camera and the EFP lens, an adaptor (system camera lens adaptor) is used to mechanically and electrically connect them (e.g., see PTL 1).

As a specification for an interface (connector) to electrically connect a television camera and a television lens, both an EFP camera and an EFP lens have a mount provided with a 36-pin connector. Between the EFP camera and the EFP lens, a signal is transmitted through the connectors.

Both an ENG camera and an ENG lens are provided with a 12-pin connector, and the connectors are connected through a cable. Between the ENG camera and the EFP lens as well, a signal is transmitted through the connectors.

In such interface specifications, an EFP lens has been mounted on an ENG camera via a system camera lens adaptor as follows. Conventionally, signal transmission between the ENG camera and the EFP lens has been limited only to parallel communication. In addition, in the system camera lens adaptor, a pin used for parallel communication of a connector of the ENG camera is connected to a pin of a connector of the EFP lens corresponding to the pin used for parallel communication.

CITATION LIST

Patent Literature

PTL 1: JP 07-225424 A

SUMMARY OF THE INVENTION

Technical Problem

Iris adjustment of an EFP lens is performed based on an iris control signal from an ENG camera. A general ENG camera is not provided with an iris adjustment function and is not capable of mounting an iris adjustment remote controller. An EFP lens therefore has an iris to be adjusted using a camera control unit (CCU) connected to the ENG camera and is designed not to allow a cameraman to adjust the iris. However, a cameraman sometimes prefers iris adjustment at hand.

The present invention has been made in view of the above situation, and it is an object thereof to provide a system camera lens adaptor that enables iris adjustment by a cameraman at hand.

Solution to Problem

According to the present invention, provided is a system camera lens adaptor, enabling mounting, on a camera device, of a lens device originally not mountable on the camera device, comprising an iris volume capable of adjusting an iris of the lens device.

Since the system camera lens adaptor of the present invention is provided with an iris volume, a cameraman can adjust the iris at hand without additionally connecting a cable.

Various embodiments below exemplify the present invention. The following embodiments may be combined with each other.

Each characteristic in the embodiments below that does not essentially require an iris volume to achieve the characteristic provides another independent invention from another perspective without the iris volume.

It is preferred that the system camera lens adaptor further includes a power input connector to supply external power from an external power source other than the camera device to the system camera lens adaptor.

It is preferred that the system camera lens adaptor is configured to allow the external power to be supplied to the lens device.

It is preferred that the system camera lens adaptor further includes a connector connectable to an iris remote controller capable of adjusting the iris of the lens device.

It is preferred that the iris remote controller is configured to allow rough adjustment of the iris and the iris volume is configured to allow fine adjustment of the iris.

It is preferred that the system camera lens adaptor includes a first mode to adjust the iris on the system camera lens adaptor and a second mode to adjust the iris on the camera device.

It is preferred that the system camera lens adaptor includes a third mode to perform the rough adjustment of the iris on the camera device and to perform the fine adjustment of the iris on the system camera lens adaptor.

It is preferred that the system camera lens adaptor further includes: a position signal input connector to input a position signal; and an indicator to provide indication based on the position signal.

It is preferred that the system camera lens adaptor further includes a lens status display unit to indicate a zoom position, a focus position, and an iris value of the lens device based on a signal from the lens device.

It is preferred that the system camera lens adaptor further includes a switch to set whether or not to use an extender of the lens device.

It is preferred that the camera device includes a video recording function and includes a REC button to switch ON and OFF of the video recording function and a video recording status display unit to indicate an ON or OFF state of the video recording function.

It is preferred that the system camera lens adaptor has an input of an intercom including a plurality of lines and has a function of switching the plurality of lines.

DESCRIPTION OF EMBODIMENTS

Embodiments of the present invention are described below with reference to the drawings. Various characteristics in the embodiments described below may be combined with each other. Each characteristic is independently inventive. The descriptions below shows a case of using an ENG camera 34 and an EFP lens 32 in combination as an example, whereas the present invention is also applicable to another type of camera device and lens device. For example, the present invention is also applicable to a case of using a movie camera combined with an EFP lens. In particular, the present invention is preferably applicable to combination of a camera device and a lens device that are not capable of iris adjustment without a CCU.

Figure 1:
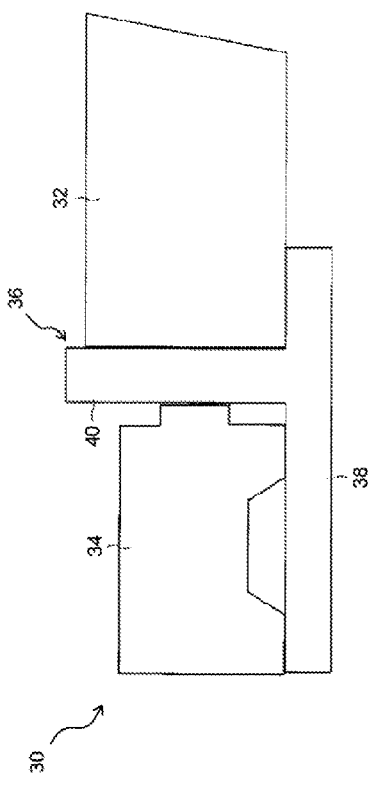
FIG. 1 is a schematic side view illustrating a configuration of a television camera system 30 configured using a system camera lens adaptor 36 in an embodiment of the present invention.

FIG. 1 is an exterior side view illustrating a configuration of a television camera system 30 configured using a system camera lens adaptor of the present invention. The television camera system 30 illustrated in FIG. 1 is provided with an EFP lens 32, an ENG camera 34, and a system camera lens adaptor 36. The EFP lens 32 is a lens device for an EFP camera that is used by being fixed on a tripod mainly in a studio and the like. The EFP lens 32 is a large lens device having an imaging optical system (imaging lens), a control circuit, and the like mounted in a box case. The EFP lens 32 may be referred to as a box lens. The EFP lens 32 has a built in extender.

The ENG camera 34 is mainly carried for news gathering and the like and is a camera device to be used by being supported by a cameraman at the shoulder or the like. The ENG camera 34 is originally a camera device used with a small lens device (ENG lens) mounted thereon, and not with the EFP lens as illustrated in FIG. 1.

The adaptor 36 is an adaptor to enable mounting and use of the EFP lens 32 and the ENG camera 34, which are different in application mode, and is fixed on, for example, a tripod. The adaptor 36 is provided with a horizontal base portion 38 and a screen portion 40 provided vertically to the base portion 38. The adaptor 36 is designed to have the EFP lens 32 fixed in front (on the right in FIG. 1) of the screen portion 40 and the ENG camera 34 fixed at the rear (on the left in FIG. 1). The screen portion 40 is provided with an opening, not shown.

The EFP lens 32 and the ENG camera 34 are electrically connected via the adaptor 36 to allow exchange of various signals. Various signals are allowed to be exchanged between the ENG camera 34 and the adaptor 36, and various signals are allowed to be exchanged between the adaptor 36 and the EFP lens 32.

Figure 2:
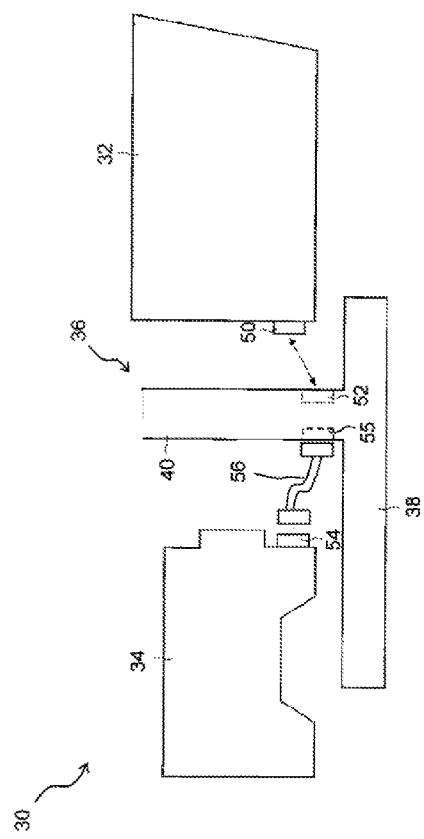
FIG. 2 is a drawing illustrating a mode of connecting an electrical connector in the television camera system 30 of FIG. 1.

FIG. 2 is a drawing illustrating a mode of connecting an electrical connector between the EFP lens 32 and the ENG camera 34. A rear surface of the EFP lens 32 is provided with a 36-pin connector 50 to exchange various signals with a camera device (generally, an EFP camera). A front surface of the screen portion 40 of the adaptor 36 is provided with a 36-pin lens side connector 52 couplable to the connector 50. When the EFP lens 32 is fixed on the adaptor 36, the connectors 50 and 52 are also directly coupled.

The ENG camera 34 is provided with a 12-pin connector 54 to exchange various signals with a lens device (generally, an ENG lens). The rear surface of the screen portion 40 of the adaptor 36 is provided with a 12-pin connector 55. The connectors 54 and 55 are connected via a cable 56. The connectors 54 and 55 may be directly coupled.

Figure 3:
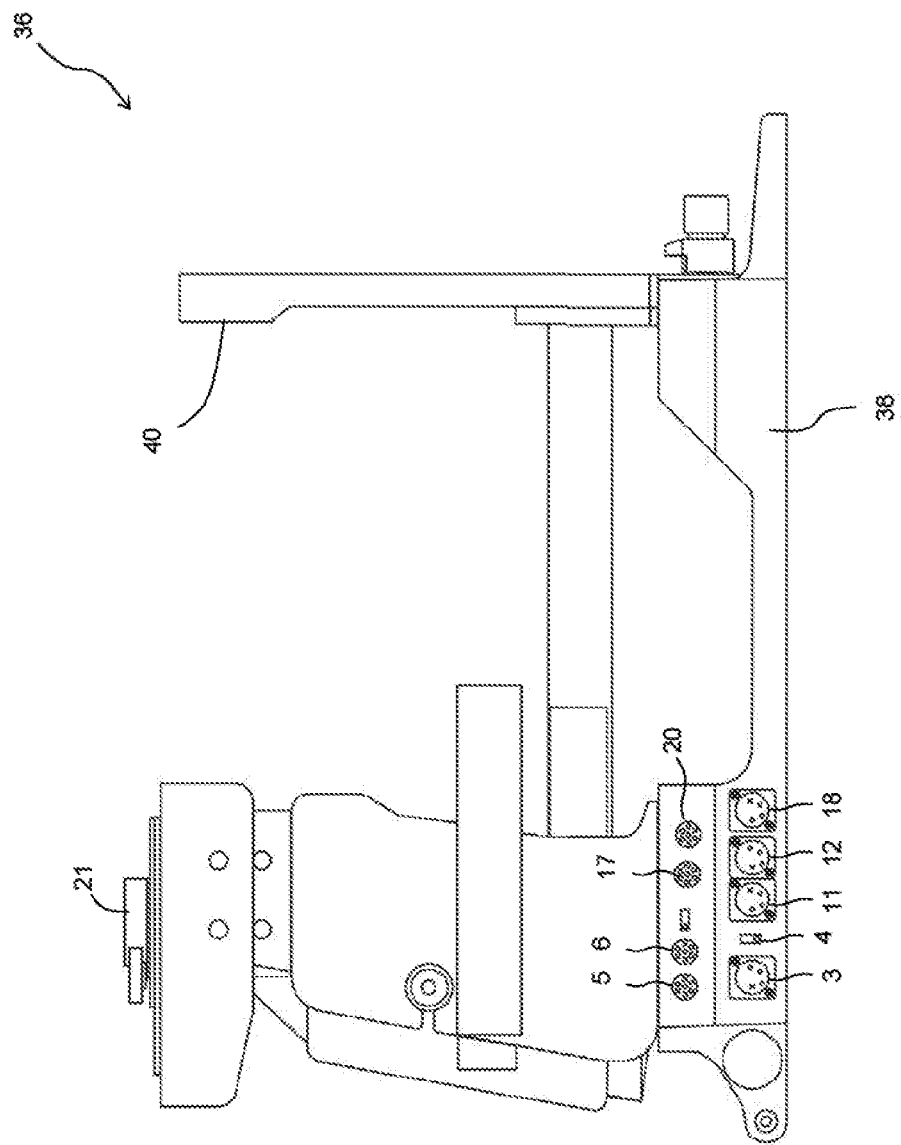
FIG. 3 is a side view illustrating a configuration of the system camera lens adaptor 36 in an embodiment of the present invention.
Figure 4:
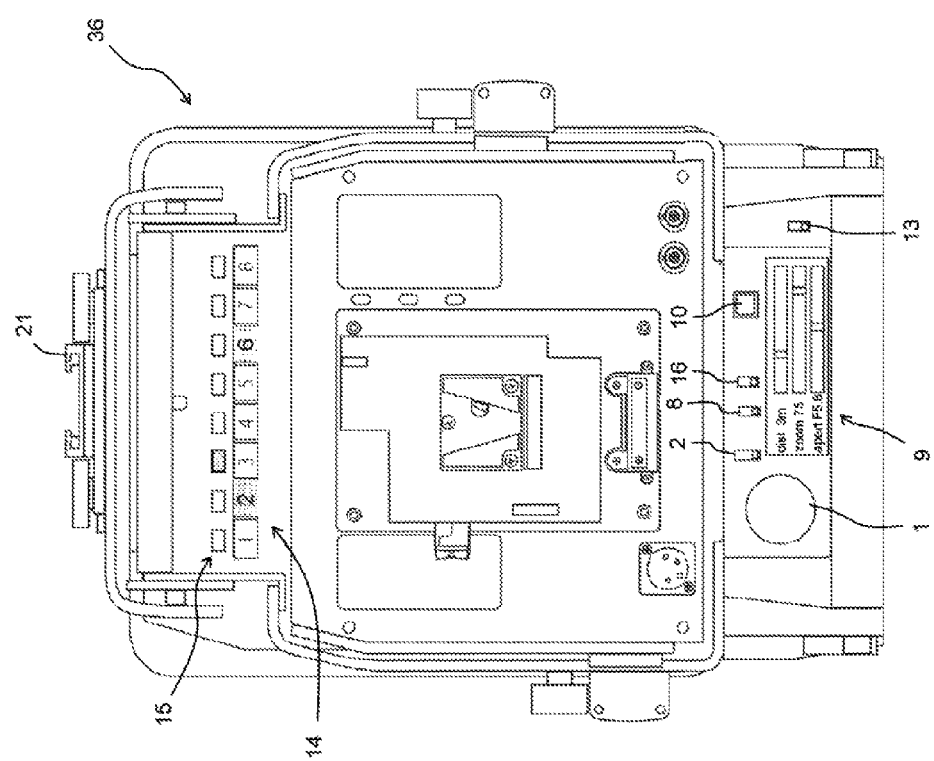
FIG. 4 is a rear view illustrating a configuration of the system camera lens adaptor 36 in an embodiment of the present invention.

FIGS. 3 and 4 are, respectively, a side view and a rear view illustrating a detailed configuration of the adaptor 36.

The adaptor 36 is provided with an iris volume 1 that is capable of adjusting an iris of the EFP lens 32. Although the iris volume 1 in the present embodiment is a rotary type, it may be of another type, such as a sliding type. By an operation of the iris volume 1, an iris control voltage output from the adaptor 36 varies. The iris control voltage is input to the EFP lens 32 through the connectors 50 and 52, and the EFP lens 32 performs iris adjustment based on the input iris control voltage. Conventionally, iris adjustment has been performed by an input of an iris control voltage output from the connector 54 of the ENG camera 34 to the connector 50 and no method of adjusting the iris control voltage at hand has been available for a cameraman. Since only the camera control unit connected to the ENG camera 34 has been capable of adjusting the iris control voltage output from the ENG camera 34, it has been inconvenient that a cameraman has not been allowed to adjust the iris. In the present embodiment, the iris control voltage may be adjusted by operating the iris volume 1 provided with the adaptor 36, and thus a cameraman is allowed to adjust the iris of the EFP lens 32 at hand.

The adaptor 36 is provided with a connector 20 connectable to an iris remote controller, not shown. The iris remote controller is not limited in the configuration as long as the iris remote controller has a function capable of adjusting the iris control voltage. Such a configuration enables iris adjustment of the EFP lens 32 using the iris remote controller even in a position apart from the adaptor 36. In addition, for example, it is possible that a person other than a cameraman performs the rough adjustment of the iris using the iris remote controller and the cameraman performs the fine adjustment of the iris using the iris volume 1. In this case, an iris control voltage set by an iris remote controller is configured to be increased or decreased when the iris volume 1 is operated, and thus a cameraman is capable of performing fine adjustment of slight brightening or slight darkening.

The adaptor 36 is provided with an iris adjustment mode switching switch 2. The iris adjustment mode switching switch 2 is capable of switching an iris adjustment mode. The adaptor 36 is provided with three iris adjustment modes. In a first mode, the iris is adjusted on the adaptor 36 side. In this mode, an iris control voltage input from the connector 54 of the ENG camera 34 to the adaptor 36 is ignored, and an iris control voltage set by using the iris remote controller or the iris volume 1 is input to the EFP lens 32. In a second mode, an iris control voltage set by using the iris remote controller or the iris volume 1 is ignored, and an iris control voltage set by an iris auto mode of the ENG camera 34 or an iris control voltage set by the CCU is input to the EFP lens 32 through the adaptor 36. In a third mode, the iris is roughly adjusted on the ENG camera 34 side and finely adjusted on the adaptor 36 side. In the third mode, an iris control voltage set on the ENG camera 34 side is configured to be increased or decreased by an operation of the iris remote controller or the iris volume 1, and thus a cameraman is capable of performing fine adjustment of slight brightening or slight darkening. Further, the adaptor 36 is provided with an iris auto/manual switch 8, and this switch is operated to switch iris adjustment between by using the iris auto mode of the ENG camera 34 and by manually using the iris remote controller or the iris volume 1.

A conventional EFP lens 32 used to operate by power supplied from the ENG camera 34. However, an EFP lens 32 of high power with high power consumption appears in recent years, and power supplied from the ENG camera 34 sometimes cannot drive the EFP lens 32. In the present embodiment, the adaptor 36 is provided with a power input connector 3 and the power input connector 3 is connected to a power cable to enable supply of external power from an external power source (battery) other than the ENG camera 34 to the adaptor 36. In this case, the EFP lens 32 is driven using external power to allow avoidance of a problem of malfunction due to power shortage. Power is supplied from the adaptor 36 to the EFP lens 32 through the connectors 50 and 52.

When the power input connector 3 is not connected to an external power source, power may be supplied from the ENG camera 34 to the adaptor 36 through the connector 54 of the ENG camera 34. In addition, the adaptor 36 is provided with a power switching switch 4, and the power switching switch 4 is operated to switch power supply between the power from the ENG camera 34 to be supplied to the EFP lens 32 and power from an external power source to be supplied to the EFP lens 32.

The adaptor 36 is provided with a position signal input connector 17, and the position signal input connector 17 is connected to one end of a position signal cable. The position signal cable has the other end connected to a video switcher, and a position signal is input from the video switcher to the adaptor 36 through the position signal cable. The position signal contains an identifier (e.g., ID number) and may contain luminescence color information (red, green, etc.). The adaptor 36 is provided with a switcher selected position indicator 14. The indicator 14 functions as a display unit to provide indication based on the position signal. For example, in the case where the position signal contains the luminescence color information of red and the identifier of "2", the indicator 14 has the number 2 lit in red. This indicates that the video switcher is currently selecting a video image of a video camera of number 2. In the case where the position signal contains the luminescence color information of green and the identifier of "6", the indicator 14 has the number 6 lit in green. This indicates that the video switcher is next going to select a video image of a video camera of number 6. It is thus possible to find, only by viewing the indicator 14, which video camera is selected currently or next by the video switcher. In addition, the adaptor 36 is provided with a position designation switch 15. In the present embodiment, the position designation switch 15 is configured with eight press button switches, and a user can designate an identifier of his/her video camera using the position designation switch 15. FIG. 4 illustrates a state of designating the number 3.

The adaptor 36 may have a tally lamp, not shown, placed in the screen portion 40, for example. The adaptor 36 is provided with a tally input connector 5 and a tally output connector 6. A tally signal input to the tally input connector 5 is directly output from the tally output connector 6. The tally signal output from the tally output connector 6 is input to the tally lamp. The tally lamp is lit based on the tally signal. The tally lamp is configured to vary luminescence color based on the voltage of the tally signal, and for example, lit in green at a voltage of the tally signal from 2 to 4 V and lit in red at a voltage of the tally signal of 5 V or more. The adaptor 36 is further provided with a contact switching switch 7. The switch 7 is operated to switch an input type between make contact and voltage contact.

The adaptor 36 is provided with a lens status display unit 9 to indicate a zoom position, a focus position, and an iris value of the EFP lens 32 based on a signal from the EFP lens 32. Specifically, the connector 50 of the EFP lens 32 has pins to which feedback voltages corresponding to the zoom position, the focus position, and the iris value of the EFP lens 32 are output, respectively. The lens status display unit 9 indicates the zoom position, the focus position, and the iris value of the EFP lens 32 based on the voltage value. The 12-pin connector of the ENG camera 34 does not have a pin assigned to the feedback voltage. When a 12-pin connector of the ENG camera 34 and a 36-pin connector of the EFP lens 32 are connected as in PTL 1, the feedback voltage is thus not input to the ENG camera 34. Therefore, it used not to be possible to indicate the zoom position, the focus position, and the iris value based on an output of the EFP lens 32. In contrast, in the present embodiment, the adaptor 36 is provided with the lens status display unit 9, thereby enabling indication of the zoom position, the focus position, and the iris value based on the output of the EFP lens 32.

The adaptor 36 is provided with an extender setting switch 13. The switch 13 is operated to enable setting whether to use an extender built in the EFP lens 32.

The adaptor 36 is provided with a REC button 10. Pressing the REC button 10 enables switching ON/OFF of the video recording function of the ENG camera 34. Lighting the REC button 10 while the video recording function of the ENG camera 34 is turned ON enables indication of the ON/OFF state of the video recording function of the ENG camera 34. The ENG camera 34 with a video recording function has a REC button in the camera itself. When the REC button is provided on the lens side of the camera, in a state where the adaptor 36 is mounted on the camera, a gap between the camera and the screen portion 40 is sometimes too narrow to press or readily press the REC button of the camera. However, in the present embodiment, since the adaptor 36 is provided with the REC button, the video recording function of the ENG camera 34 is readily turned ON/OFF. The signal to turn ON/OFF the video recording function is input from the adaptor 36 to the ENG camera 34 through the 12-pin connectors 54 and 55.

The adaptor 36 is provided with an intercom input connector 11 for an ENG line, an intercom input connector 12 for a producer line, an intercom headset terminal 18, and an intercom change switch 16. Using the intercom change switch 16, the line to be used can be switched.

The adaptor 36 is provided with a viewfinder attachment portion 21. A viewfinder, not shown, can be mounted on the viewfinder attachment portion 21. On the ENG camera 34, a transmission device can be mounted. It is thus possible to transmit a video image taken by the ENG camera 34 to the video switcher and to receive a return image from the video switcher. The taken video image or the return image can be displayed on the viewfinder. The ENG camera 34 may be used standalone without being connected to the video switcher. In this case, the taken video image can be recorded in a storage device built in the ENG camera 34.

REFERENCE SIGNS LIST

1: Iris Volume
2: Iris Adjustment Mode Switching Switch
3: Power Input Connector
4: Power Switching Switch
5: Tally Input Connector
6: Tally Output Connector
7: Contact Switching Switch 8: Iris Auto/Manual Switch
9: Lens Status Display Unit
10: REC Button
11: Intercom Input Connector for ENG Line
12: Intercom Input Connector for Producer Line
13: Extender Setting Switch
14: Switcher Selected Position Indicator
15: Position Designation Switch
16: Intercom Change Switch
17: Position Signal Input Connector
18: Intercom Headset Terminal
20: Connector
30: Television Camera System
32: EFP Lens
34: ENG Camera
36: Adaptor
38: Base Portion
40: Screen Portion
50: Connector
52: Connector
54: Connector
55: Connector
56: Cable

The invention claimed is:

1. A system camera lens adaptor, enabling mounting, on a camera device, of a lens device originally not mountable on the camera device, comprising:
   an iris control capable of adjusting an iris of the lens device; and
   a lens connector configured to communicate with the lens device;
   wherein the iris control is manually operable in a state that the lens device is mounted on the system camera lens adaptor, and
   wherein an iris control voltage varied by operation of the iris control is output from the lens connector.

2. The system camera lens adaptor according to claim 1, further comprising
   a power input connector to supply external power from an external power source other than the camera device to the system camera lens adaptor.

3. The system camera lens adaptor according to claim 2, wherein the system camera lens adaptor is configured to allow the external power to be supplied to the lens device.

4. The system camera lens adaptor according to claim 1, further comprising a connector connectable to an iris remote controller capable of adjusting the iris of the lens device.

5. The system camera lens adaptor according to claim 4, wherein the iris remote controller is configured to allow rough adjustment of the iris and the iris control is configured to allow fine adjustment of the iris.

6. The system camera lens adaptor according claim 1, wherein the system camera lens adaptor includes a first mode to adjust the iris on the system camera lens adaptor and a second mode to adjust the iris on the camera device.

7. The system camera lens adaptor according to claim 6, wherein the system camera lens adaptor includes a third mode to perform the rough adjustment of the iris on the camera device and to perform the fine adjustment of the iris on the system camera lens adaptor.

8. The system camera lens adaptor according to claim 1, further comprising:
   a position signal input connector to input a position signal; and
   an indicator to provide indication based on the position signal.

9. The system camera lens adaptor according to claim 1, further comprising a lens status display unit to indicate a zoom position, a focus position, and an iris value of the lens device based on a signal from the lens device.

10. The system camera lens adaptor according to claim 1, further comprising a switch to set whether or not to use an extender of the lens device.

11. The system camera lens adaptor according to claim 1, wherein the camera device includes a video recording function and includes a REC button to switch ON and OFF of the video recording function and a video recording status display unit to indicate an ON or OFF state of the video recording function.

12. The system camera lens adaptor according to claim 1, wherein the system camera lens adaptor has an input of an intercom including a plurality of lines and has a function of switching the plurality of lines.

13. The system camera lens adaptor according to claim 1, further comprising a camera connector configured to communicate with the camera device,
   wherein an iris control voltage from the camera device is input into the system camera lens adaptor via the camera connector; and
   wherein the iris control voltage from the camera device is output from the lens connector.

14. The system camera lens adaptor according to claim 13, further comprising a screen portion, wherein the lens connector and camera connector are carried by the screen portion.

15. The system camera lens adaptor according to claim 14, wherein the screen portion is configured to couple with the camera device on a first side and the lens device on a second side.

16. The system camera lens adaptor according to claim 14, further comprising a base portion, wherein the screen portion configured to be vertical relative to the base portion.

17. The system camera lens adaptor according to claim 16, wherein the iris control is carried by the base portion.

* * * * *

UNITED STATES PATENT AND TRADEMARK OFFICE
CERTIFICATE OF CORRECTION

PATENT NO. : 9,817,300 B2
APPLICATION NO. : 15/211907
DATED : November 14, 2017
INVENTOR(S) : Hashiguchi et al.

Page 1 of 1

It is certified that error appears in the above-identified patent and that said Letters Patent is hereby corrected as shown below:

On the Title Page

(73)          Assignee        "Nihon Video Systems Co., Ltd.," should read
Column 1                               --Nihon Video System Co., Ltd.,--

Signed and Sealed this
Twenty-fourth Day of July, 2018

Andrei Iancu
*Director of the United States Patent and Trademark Office*